United States Patent
Tsukamoto

(10) Patent No.: US 7,865,918 B2
(45) Date of Patent: Jan. 4, 2011

(54) DISPLAY APPARATUS, USER TERMINAL, DISTRIBUTION APPARATUS, CONTROL METHOD THEREOF, COMPUTER PROGRAM AND STORAGE MEDIUM

(75) Inventor: Takahiro Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 11/183,023

(22) Filed: Jul. 14, 2005

(65) Prior Publication Data

US 2006/0015572 A1    Jan. 19, 2006

(30) Foreign Application Priority Data

Jul. 16, 2004  (JP)  ............... 2004-209958
Jul. 7, 2005   (JP)  ............... 2005-199144

(51) Int. Cl.
H04N 7/10    (2006.01)
H04N 7/025   (2006.01)
H04N 7/18    (2006.01)
H04N 7/16    (2006.01)
H04H 40/00   (2008.01)
G06F 15/16   (2006.01)

(52) U.S. Cl. ............... 725/36; 725/32; 725/74; 725/62; 709/219; 455/3.06

(58) Field of Classification Search ............... 725/32, 725/36; 709/219
See application file for complete search history.

(56) References Cited

U.S. PATENT DOCUMENTS

2003/0028430 A1*  2/2003  Zimmerman ............... 705/14
2003/0149601 A1*  8/2003  Cabral ...................... 705/5
2007/0179954 A1*  8/2007  Kudoh et al. ............... 707/9

FOREIGN PATENT DOCUMENTS

JP    10-240205    9/1998

OTHER PUBLICATIONS

English Abstract for Japanese Patent Application 10-240205.

* cited by examiner

Primary Examiner—Joseph P Hirl
Assistant Examiner—Fred Peng
(74) Attorney, Agent, or Firm—Cowan, Liebowitz & Latman, P.C.

(57) ABSTRACT

There is provided a content distribution system configured by a distribution apparatus for storing content data, a display apparatus for displaying content data distributed from the distribution apparatus in accordance with a predetermined display schedule, and a user terminal for acquiring the content data displayed on the display apparatus from the distribution apparatus. The user terminal receives data of a display schedule from the display apparatus, and requests the distribution apparatus to send data of content identified from the display schedule.

5 Claims, 10 Drawing Sheets

PLEASE ACCESS THIS TERMINAL AT THE FOLLOWING URL http://www.xxx.jp/

FIG. 9

| CONTENT DISTRIBUTION APPARATUS ID 901 | CONTENT DISPLAY APPARATUS ID 902 | DISPLAY TIME TABLE 903 | CONTENT ID 904 |
|---|---|---|---|
| SER1 | TER1 | July 5th 12:00 | A |
| SER1 | TER1 | July 5th 12:02 | B |
| ..... | ..... | ..... | ..... |
| SER1 | TER1 | July 5th 13:30 | M |
| SER1 | TER1 | July 5th 13:34 | N |

F I G. 10

| 1001 | 1002 | 1003 | 1004 | 1005 | |
|---|---|---|---|---|---|
| CONTENT DISPLAY APPARATUS ID | CONTENT ID | CONTENT NAME | DISTRIBUTION FLAG | FREQUENCY | |
| TER1 | A | CM1 | 1 | 3tph | ⋮ |
| | B | MV1 | 0 | 4tph | ⋮ |
| | ⋅ | ⋅ | ⋅ | ⋅ | ⋮ |
| | ⋅ | ⋅ | ⋅ | ⋅ | ⋮ |
| | ⋅ | ⋅ | ⋅ | ⋅ | ⋮ |
| | M | CM2 | 1 | 10tpd | ⋮ |
| | N | AV1 | 0 | 5tph | ⋮ |
| ⋅ | ⋅ | ⋅ | ⋅ | ⋅ | ⋮ |
| ⋅ | ⋅ | ⋅ | ⋅ | ⋅ | ⋮ |
| ⋅ | ⋅ | ⋅ | ⋅ | ⋅ | ⋮ |

US 7,865,918 B2

DISPLAY APPARATUS, USER TERMINAL, DISTRIBUTION APPARATUS, CONTROL METHOD THEREOF, COMPUTER PROGRAM AND STORAGE MEDIUM

FIELD OF THE INVENTION

The present invention relates to a content distribution system for distributing content such as advertisement.

BACKGROUND OF THE INVENTION

Recently, content distribution systems have been broadly utilized in which a display apparatus for displaying content data such as pictures is installed in a place where the display apparatus can easily attract public attention, such as in a station, in a store, in a shopping center, in a department store or in an open space in a town. Consequently, people nowadays are surrounded by such displays.

The content distributed by such content distribution systems is typically oriented towards advertisement pictures. Thus, the content distribution systems are utilized by advertisers who expect an efficient advertisement effect to be obtained by means other than home TV or radios, by narrowing the distribution area or the distribution target. Railroad companies may, in some cases, utilize display apparatuses installed in stations or trains to provide information about areas along the railroad lines, thereby encouraging passengers to utilize their railroads. In towns, movie theaters may provide information for movie premieres.

Such a content distribution system is generally configured by a content distribution apparatus in a distribution center, which has a server function of storing content data to be distributed, and multiple content display apparatuses for receiving the content data via a network or the like and displaying the received content data.

In this case, one of the possible configurations is that the distribution center performs overall management of a content display schedule, and the content display apparatuses are configured to sequentially display the distributed content data in the received order. Another alternative is that the content distribution apparatus in the distribution center only stores content, and the content display apparatuses create and manage a display schedule themselves.

In the content distribution system as described above, it is common that content is displayed in a unilateral way, namely viewers who see the content are in a passive situation. Therefore, the content which is broadcasted from the same content distribution apparatus and displayed on the content display apparatuses is often not adapted to regional characteristics or difference between targeted viewers. Consequently, the advertisement effects obtained by content distribution in such a content distribution system are definitely not optimized.

Furthermore, when content is stored on the content display apparatus side, each content display apparatus is required to be provided with equipment for storage, which generates a cost problem.

Furthermore, from a viewer's perspective, if the viewer wants to see content he or she has just seen again, he or she has to wait for it to be displayed again, because the content display apparatus displays content data in accordance with a schedule set in advance. Thus, in some cases, a viewer may feel inconvenience, and sufficient advertisement effect may not be obtained.

SUMMARY OF THE INVENTION

One aspect of the present invention concerns a user terminal which connects to a distribution apparatus for distributing content data to a display apparatus for displaying the content data in accordance with a predetermined display schedule and to the display apparatus, via the network; the user terminal comprising a first request unit for requesting the display apparatus to send the display schedule, a display unit for displaying the display schedule received in response to the request made by the first request unit, a specification acceptance unit for accepting specification of content data based on content data to be displayed on the display apparatus, which is included in the display schedule displayed by the display unit, and information about display time of the content data to be displayed, from a user of the user terminal and a second request unit for requesting the distribution apparatus to send the content data the specification of which has been accepted, wherein the display unit displays the content data received in response to the request made by the second request unit.

Another aspect of the present invention is a display apparatus for displaying content data distributed from a distribution apparatus via a network in accordance with a predetermined display schedule; the display apparatus comprising, a display unit for displaying first identification information about the display apparatus together with the content data, a request receiving unit for receiving a request to send the display schedule based on the first identification information, from a user terminal via the network, and a sending unit for sending the display schedule to the user terminal via the network in response to the request.

Still another aspect of the present invention is a distribution apparatus for distributing content data to a display apparatus for displaying the content data in accordance with a predetermined display schedule, via a network; the distribution apparatus comprising a storage unit for storing content data, a registration unit for registering distribution information about distribution of the content data, an receiving unit for receiving a content data sending request from the user terminal, a determination unit for determining whether or not to send the content data for which the sending request has been received to the user terminal based on the distribution information and a sending unit for sending the content data relevant to the sending request via the network if it is determined by the determination unit that sending to the user terminal is possible.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 shows an example of a display schedule on the content display apparatus 103 according to the embodiments of the present invention; and FIG. 10 shows an example of distribution information in the content distribution apparatus 101 according to the embodiments of the present invention.

DETAILED DESCRIPTION OF THE PREFERRED EMBODIMENTS

Preferred embodiments of the present invention will be described in detail in accordance with the accompanying drawings.

Figure 1:
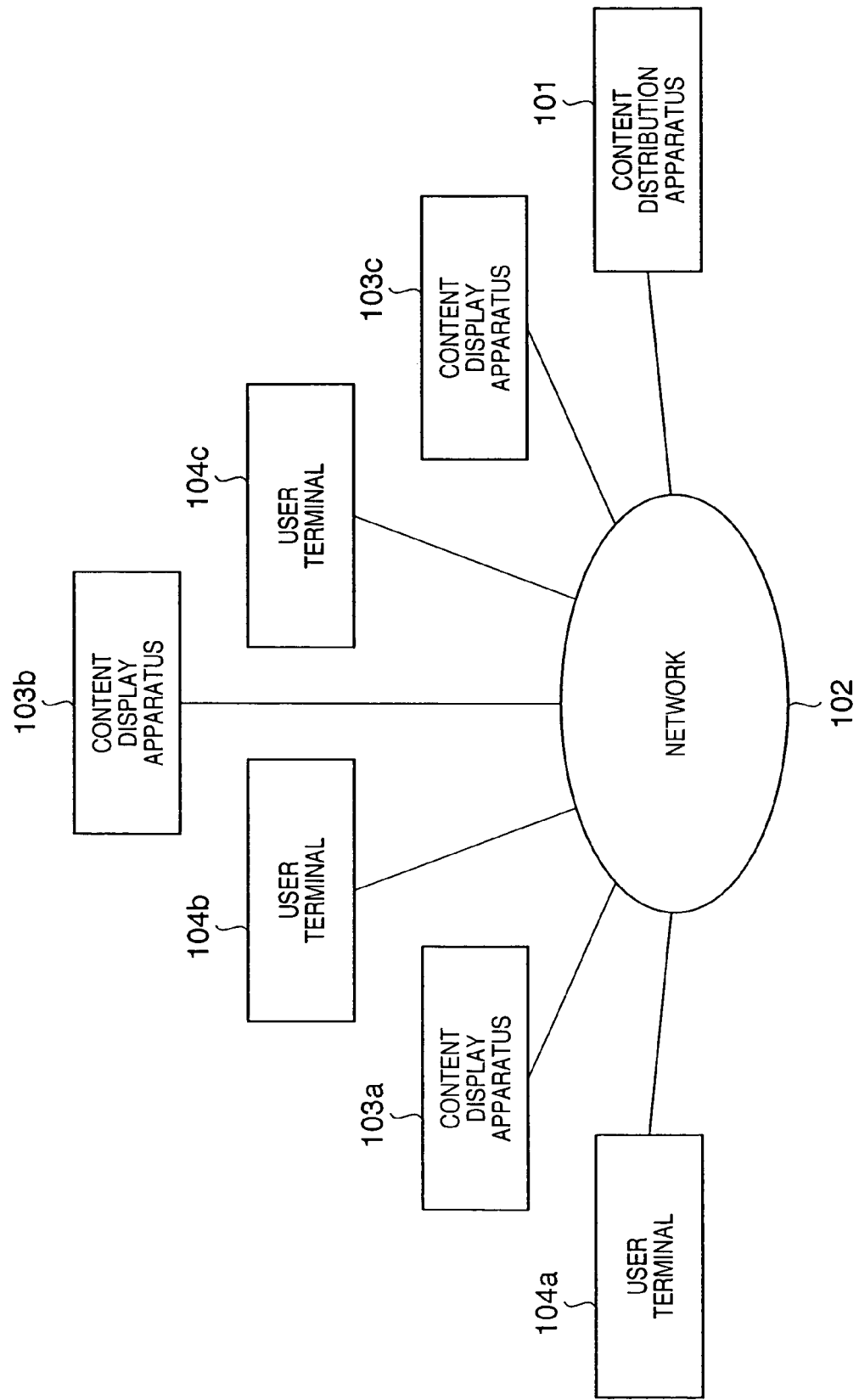
FIG. 1 shows an example of the configuration of a content distribution system according to embodiments of the present invention.

FIG. 1 shows an example of the configuration of a content distribution system according to embodiments of the present invention. In FIG. 1, reference numeral 101 denotes a content distribution apparatus, which is the central component of the content distribution system. The content distribution apparatus 101 performs the registration and storage of content data to be distributed, such as picture information, the creation of a distribution schedule for the content data, and the distribution of content. Reference numeral 102 denotes a network, namely the Internet or a LAN, for example. The content distribution apparatus 101 is connected to the network 102, and then connected to content display apparatuses 103a to 103c via the network 102.

The content display apparatuses 103a to 103c (hereinafter, any of these content display apparatuses is simply referred to as "a content display apparatus 103") are display apparatuses for displaying content data sent from the content distribution apparatus 101. The Content display apparatus 103 could represent a display installed, for example, on a street, in a station or in a train. The content display apparatus 103 receives control data for creating display schedule data for displaying content data, content data to be displayed by the content display apparatus 103 itself, and the like, from the content distribution apparatus 101.

Reference numerals 104a to 104c denote user terminals, which are held by users who can view the content display apparatus 103. Hereinafter, any of these user terminals is simply referred to as "a user terminal 104". For example, the user terminal 104 could be a PDA (personal digital assistant), a cellular phone, a laptop computer or the like.

FIG. 1 shows a single content distribution apparatus 101 and multiple content display apparatuses 103 and multiple user terminals 104. However, a number of these apparatuses connected to the network 102 are not limited to those shown in FIG. 1. Even if a different number of apparatuses are connected to the network 102, each apparatus performs operations according to this embodiment.

Figure 2:
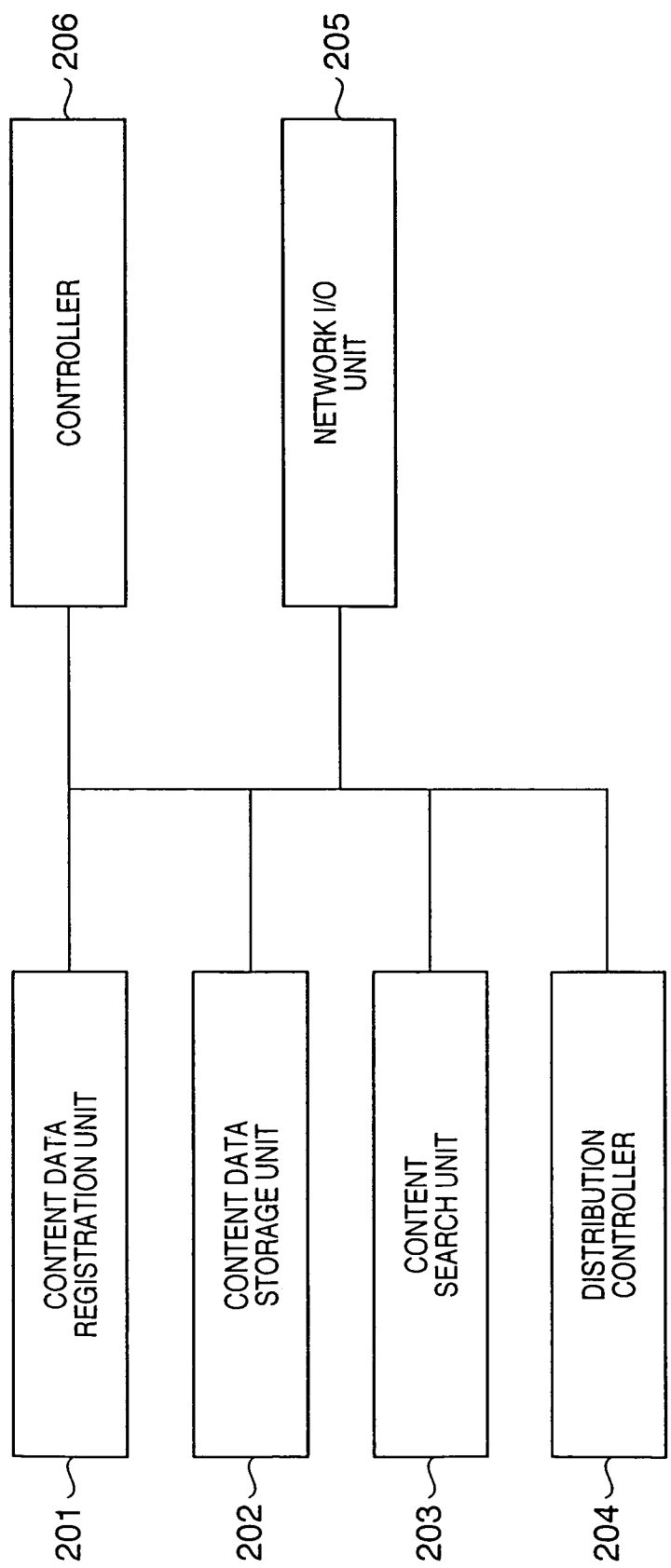
FIG. 2 shows an example of the functional configuration of a content distribution apparatus 101 according to the embodiments of the present invention.
Figure 3:
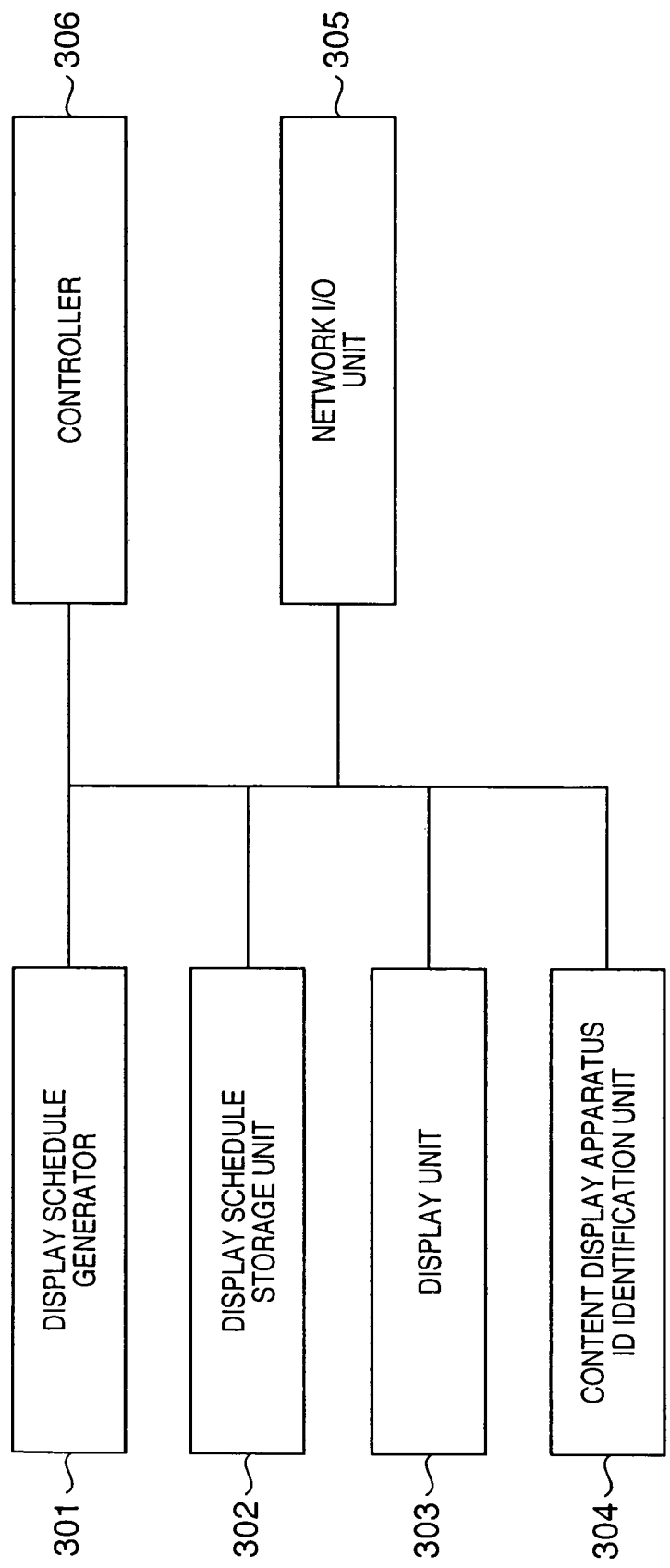
FIG. 3 shows an example of the functional configuration of a content display apparatus 103 according to the embodiments of the present invention.
Figure 4:
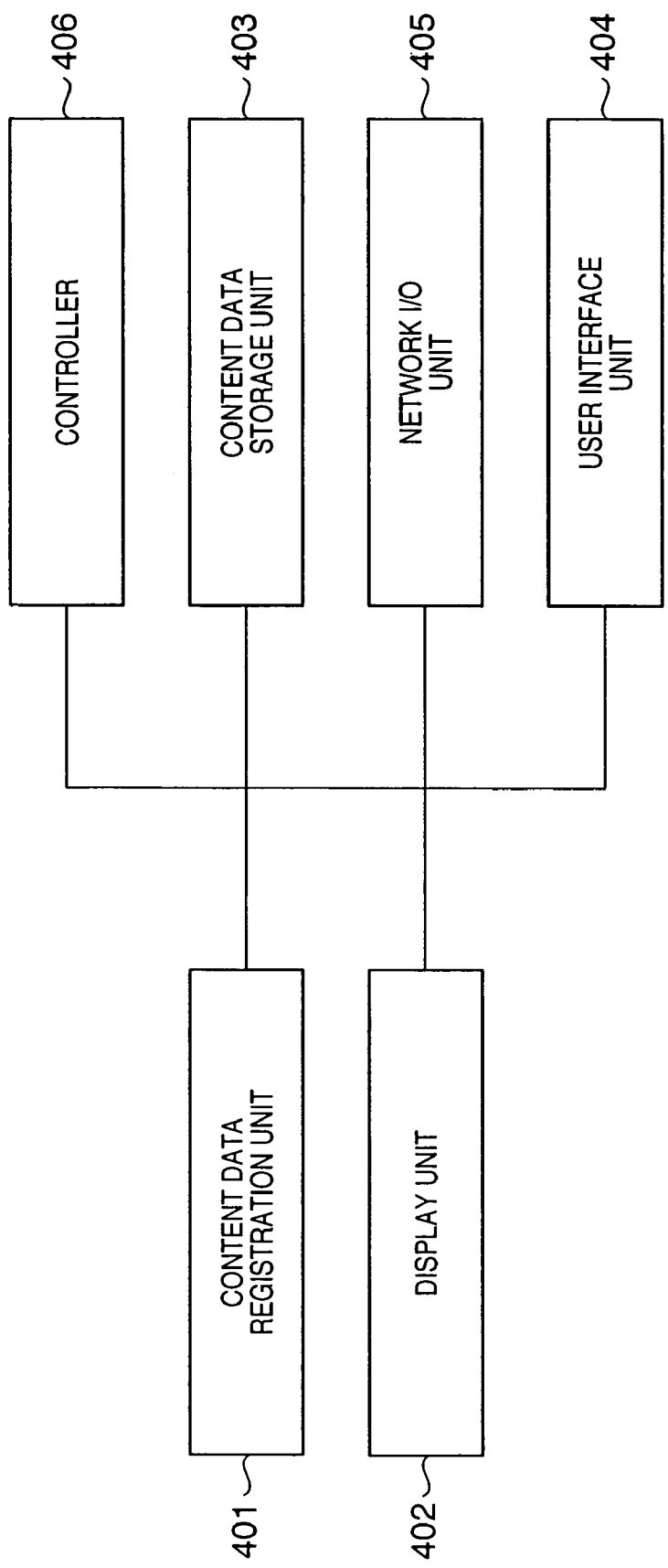
FIG. 4 shows an example of the functional configuration of a user terminal 104 according to the embodiments of the present invention.

An example of the functional configuration for each of the apparatuses and terminals will be now described with reference to FIGS. 2 to 4.

First, an example of the functional configuration of the content distribution apparatus 101 will be described with reference to FIG. 2. In the content distribution apparatus 101, reference numeral 201 denotes a content data registration unit, with which distribution information based on distribution (display) conditions specified by content distribution requesters (such as advertisement requesters) is registered. The distribution information includes at least the area to which content data is to be distributed, the frequency of display, distribution enabling/disabling settings, and the like. An example of the distribution information registered with the content data registration unit 201 will be described later with reference to FIG. 10.

Reference numeral 202 denotes a content data storage unit, which stores content data corresponding to distribution information in the content data registration unit 201. Reference numeral 203 denotes a content data search unit, which searches for content data in accordance with distribution information in the content data registration unit 201 in order to distribute the content data to the content display apparatus 103 or the user terminal 104, and sends obtained content data to a distribution controller 204.

The distribution controller 204 attaches identification information to identify the content distribution apparatus 101 to the content data and control data to be distributed, and sends them to a network I/O unit 205. In this case, the control data is information used by the content display apparatus 103 to generate a display schedule to display content data, and includes at least identification information about the content data and the display frequency.

The network I/O unit 205 is used by the content distribution apparatus 101 to communicate control data or content data with the content display apparatus 103 or the user terminal 104.

Reference numeral 206 denotes a controller, which controls a series of operations performed by respective functional components from the content data registration unit 201 to the network I/O unit 205 in the content distribution apparatus 101. The controller 206 is preferably configured by a CPU, a memory, a register, and the like.

An example of the functional configuration of the content display apparatus 103 according to this embodiment will now be described with reference to FIG. 3. Reference numeral 301 denotes a display schedule generator, which determines the insertion into or deletion from a schedule required for reproduction of content data, based on the control data sent from the content distribution apparatus 101 and generates a display schedule. This display schedule is utilized for reproduction on a display unit 303. Reference numeral 302 denotes a display schedule storage unit, which stores the display schedule created by the display schedule generator 301. The content display apparatus 103 sequentially requests content data to be displayed to the content distribution apparatus 101 in accordance with the display schedule. An example of the display schedule stored in the display schedule storage unit 302 will be described later with reference to FIG. 9.

Reference numeral 303 denotes a display unit 303, which displays content data sent from the content distribution apparatus 101. Reference numeral 304 denotes a content display apparatus ID identification unit, which determines, when receiving data from the content distribution apparatus 101 or the user terminal 104, whether it is data destined for the content display apparatus 103. when a display schedule stored in the display schedule storage unit 302 is sent to the outside via a network I/O unit 305, a content display apparatus ID is attached to the display schedule. Meanwhile, the user terminal 104 uses the content display apparatus ID received from the content display apparatus 103, when requesting the content distribution apparatus 101 to send content data.

Reference numeral 305 denotes a network I/O unit, which is used by the content display apparatus 103 to communicate data including control data and content data with the content distribution apparatus 101 or the user terminal 104 via the network 102. Reference numeral 306 denotes a controller, which controls a series of operations performed by respective functional components from the display schedule generator 301 to the network I/O unit 305 in the content display apparatus 103. The controller 306 is preferably configured by a CPU, a memory and a register.

An example of the functional configuration of the user terminal 104 will be now described with reference to FIG. 4.

Reference numeral 401 denotes a content data registration unit, which performs registration and management of content data to be used in the user terminal 104. Reference numeral 402 denotes a display unit, which displays a predetermined screen when a user operates the user terminal 104. It is also possible to display content data on the display unit 402. Reference numeral 403 denotes a content data storage unit, which stores content data to be used in the user terminal 104. In the content data storage unit 403, there is also stored data to be provided as a service to the user terminal 104. Reference numeral 404 denotes a user interface unit, which accepts operations by a user. The user interface unit 404 is preferably configured by a numeric keypad or a jog dial.

Reference numeral 405 denotes a network I/O unit, which is used by the user terminal 104 to communicate display schedule data or content data with the content distribution apparatus 101 or the content display apparatus 103 via the network 102. Reference numeral 406 denotes a controller, which controls a series of operations performed by the components from the content data registration unit 401 to the network I/O unit 405 in the user terminal 104. The controller 406 is preferably configured by a CPU, a memory and a register.

An example of the functional configuration of each of the content distribution apparatus 101, the content display apparatus 103 and the user terminal 104 has been described. The operation of each apparatus according to this embodiment will be described below. First, FIG. 5 is a flowchart showing an example of the operation of the content distribution apparatus 101.

Figure 5:
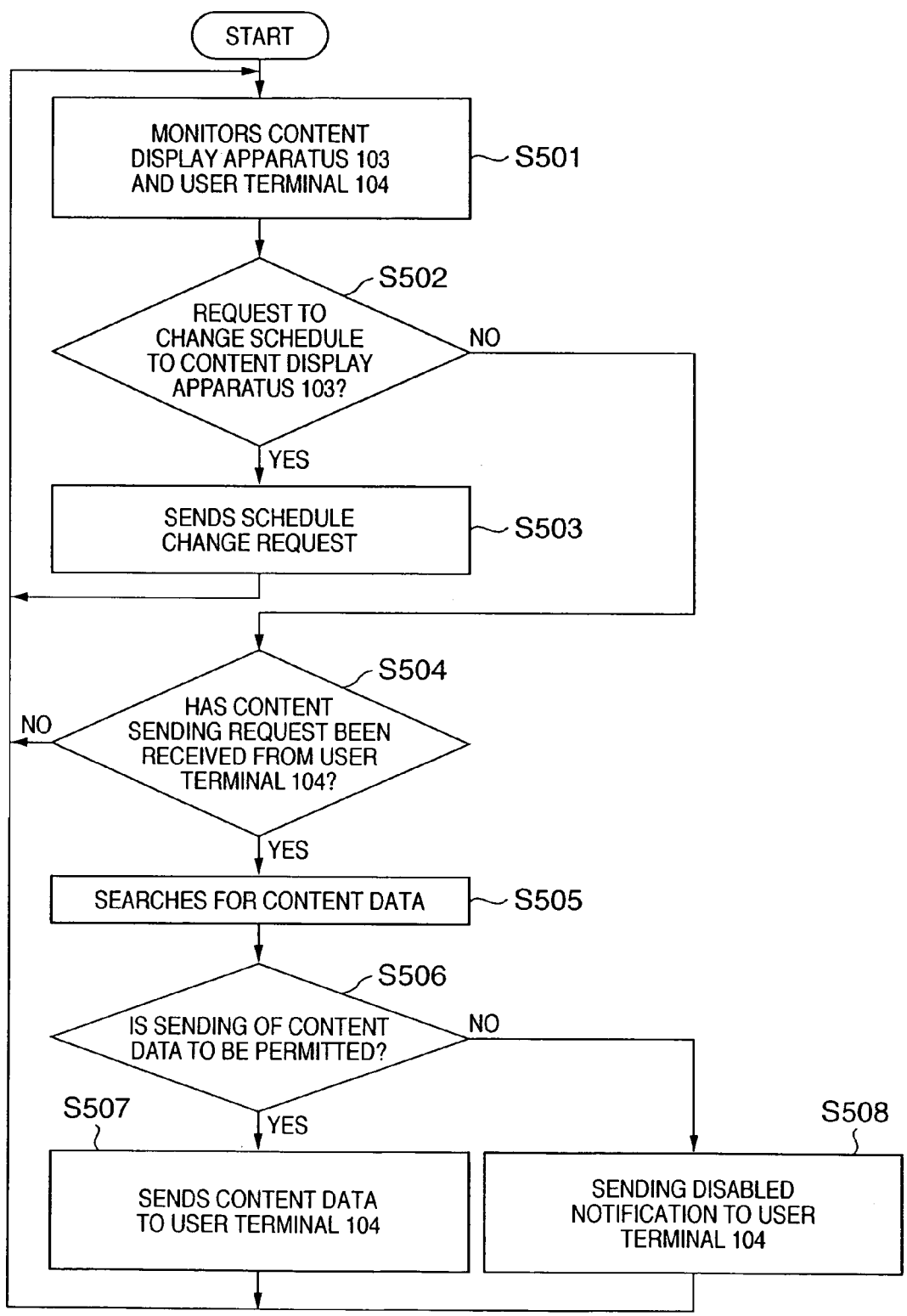
FIG. 5 is a flowchart showing an example of the operation of the content distribution apparatus 101 according to the embodiments of the present invention.

In FIG. 5, at step S501, the content distribution apparatus 101 monitors the content distribution apparatus 101 itself and communication from the content display apparatus 103 or the user terminal 104 connected via the network 102. In this case, if the content distribution apparatus 101 is requested to change the schedule of the content display apparatus 103 (YES at step S502), then the content distribution apparatus 101 proceeds to step S503. This change request may be caused when a content data distribution requester registers content data with the content distribution apparatus 101 under predetermined conditions. In this case, the predetermined conditions are based on, for example, a specification of an area in which the content display apparatus 103 is installed or a specification of the interval or frequency of displaying the content data on the content display apparatus 103. The conditions are not limited thereto, and other conditions such as a condition based on specification of a display period may be also included.

At step S503, the schedule change request is sent to the content display apparatus 103 included in the area specification. In this case, an identifier for identifying the content distribution apparatus 101, such as an IP address, is included in control data to be used by the content display apparatus 103 to re-create a schedule and transmitted. This identifier enables the content display apparatus 103 to identify the content distribution apparatus 101 on the network 102.

On the other hand, if the schedule change request has not been received (NO at step S502), then the content distribution apparatus 101 proceeds to step S504. At step S504, it is determined whether or not a content sending request has been accepted from the user terminal 104.

If the content sending request has been received from the user terminal 104 (YES at step S504), then the content distribution apparatus 101 proceeds to step S505 and searches for the content. This content search is performed by the content data search unit 203 based on distribution information registered with the content data registration unit 201. The distribution information is, for example, a table shown in FIG. 10. The details of FIG. 10 will be described later. When the content search is completed, and the content data corresponding to the sending request is found, the content distribution apparatus 101 proceeds to the next step S506. At step S506, it is determined whether or not to send the retrieved content data to the user terminal 104.

This determination can be performed, for example, based on whether or not the content data has been specified in advance as content data which can be distributed to any user of the user terminal 104. Whether it has been specified or not can be determined by referring to a distribution flag 1004 to be described later with reference to FIG. 10. In the case of paid content or content which can be distributed to particular members, it may be determined based on the attributes of the user.

If it is determined that the content data can be sent at step S506 (YES at step S506), then the content distribution apparatus 101 proceeds to step S507. At step S507, the content data is read from the content data storage unit 202 in accordance with the information from the content data search unit 203. Then, the distribution controller 204 sends the content data to the user terminal 104 which has made the content sending request, from the network I/O unit 205. If it is determined that sending is not possible (NO at step S506), then the content distribution apparatus 101 proceeds to step S508 and sends a message indicating that sending is impossible to the user terminal 104 which has made the sending request, from the network I/O unit 205.

Next, an example of the operation of the content display apparatus 103 will be described with reference to the flowchart of FIG. 6.

Figure 6:
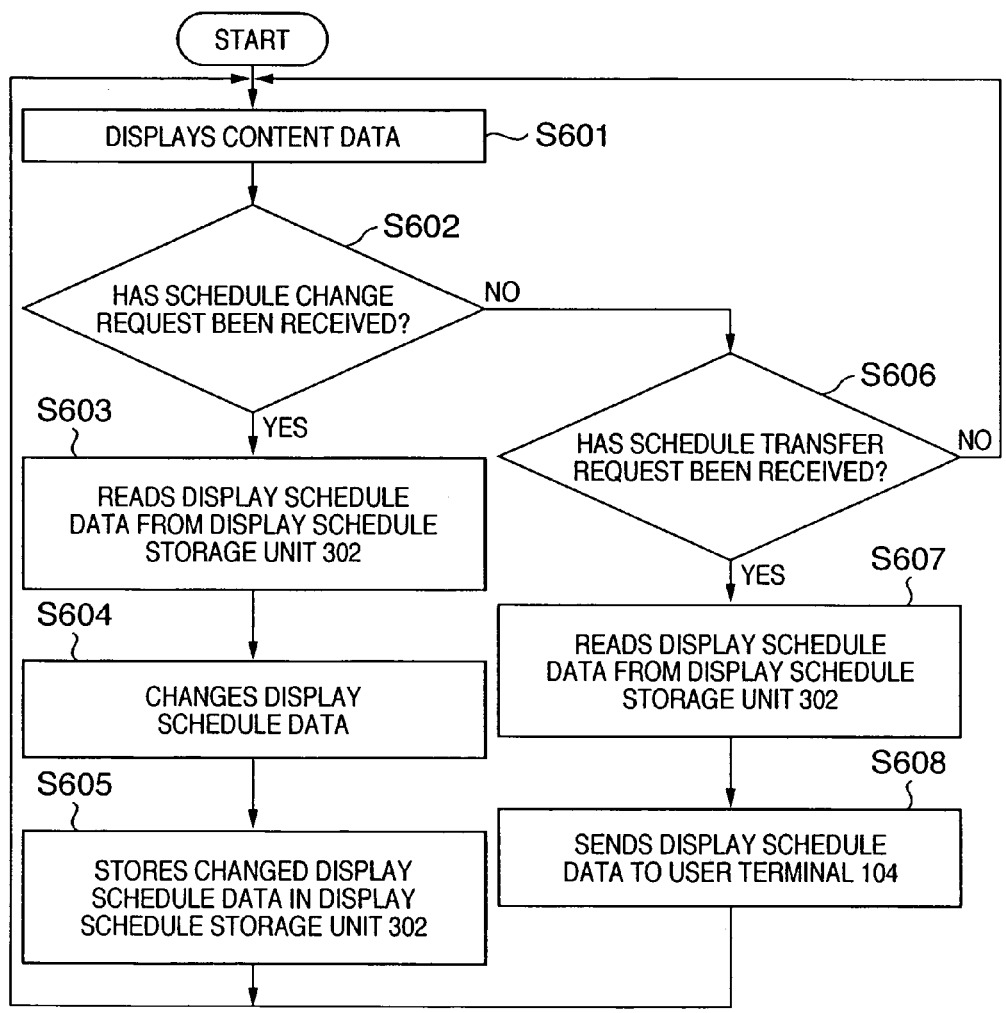
FIG. 6 is a flowchart showing an example of the operation of the content display apparatus 103 according to the embodiments of the present invention.

In FIG. 6, at step S601, the content display apparatus 103 displays content data on the display unit 303. This content data has been received from the content distribution apparatus 101 based on the display schedule in the display schedule storage unit 302. In this display condition, the content display apparatus 103 proceeds to the next step S602. At step S602, it is monitored whether or not a schedule change request has been received. This request is sent from the content distribution apparatus 101 in correspondence with step S503 in FIG. 5. If the schedule change request is received via the network I/O unit 305 (YES at step S602), then the content display apparatus 103 proceeds to step S603.

At step S603, the current display schedule data is read from the display schedule storage unit 302. The details of this display schedule data will be described later with reference to FIG. 9. At the next step S604, the display schedule generator 301 changes the read display schedule data in accordance with the received schedule change request to re-create display schedule data.

Then, at step S605, the re-created display schedule data is stored in the display schedule storage unit 302. After this, the content display apparatus 103 returns to step S601, and displays the content data in accordance with the display schedule data re-created and stored in the display schedule storage unit 302. Returning to the description of step S602, if the schedule change request has not been received from the content distribution apparatus 101 (NO at step S602), then the content display apparatus 103 proceeds to step S606. At step S606, it is determined whether or not a schedule transfer request has been received from the user terminal 104 via the network I/O unit 305. If the schedule transfer request has been received (YES at step S606), then the content display apparatus 103 proceeds to step S607 and reads the display schedule data from the display schedule storage unit 302. The content display apparatus 103 then proceeds to step S608. At step S608, the display schedule data is transferred to the user terminal 104 which has sent the schedule transfer request to the content display apparatus 103, via the network I/O unit 305. The transferred display schedule data is sent as HTML-format data so that the user terminal 104 can display it on the display unit 402 for use and accept selection, as described later. After this, the content display apparatus 103 returns again to the content display condition of step S601. On the other hand, if the display schedule transfer request has not been received at step S606 (NO at step S606), the content display apparatus 103 also returns to step S601.

Next, an example of the operation of the user terminal 104 will be described with reference to FIG. 7.

Figure 8:
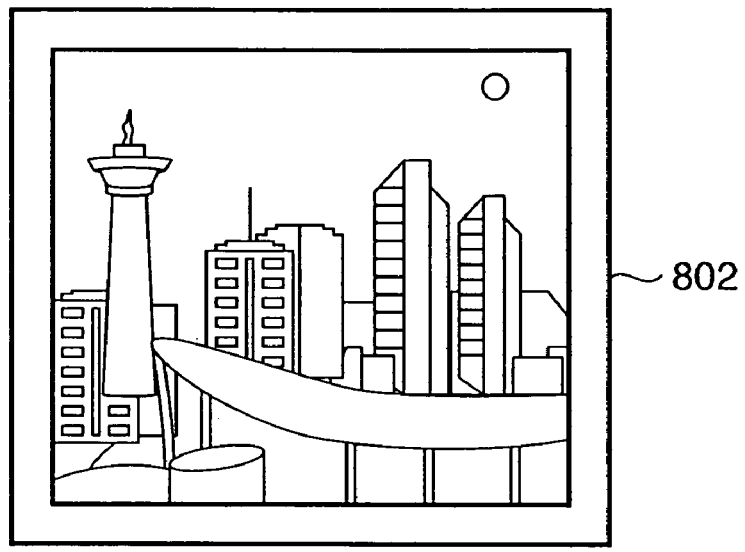
FIG. 8 shows an example of display on the content display apparatus 103 according to the embodiments of the present invention.

First, at step S701, the user terminal 104 is in a standby state as a mobile terminal. More specifically, the user terminal 104 is waiting for key input to be performed via the user interface unit 404. In this condition, the user having the user terminal 104 sees a content display apparatus 103 near him or her. An example of display state of the content display apparatus 103 in this case is as shown in FIG. 8. If the user sees the display and wants to obtain the same content as displayed content 802, then the user can make a content data transfer request as described below. First, the user terminal 104 proceeds to step S702.

At step S702, it is monitored whether or not a schedule transfer request has been accepted from a user. When the user sends a schedule transfer request, he or she first inputs a URL 801 displayed in the display area of FIG. 8 on the user terminal 104 to access the content display apparatus 103 which displays the content data, via the network I/O unit 405. In response to this, the content display apparatus 103 sends a page (in an HTML format, for example) for the user to determine whether or not to request transfer of the display schedule thereon, to the user terminal 104. The user terminal 104 displays the received page on the display unit 402, and accepts an operation of the user interface unit 404 by the user. In this case, if accepting a schedule transfer request (YES at step S702), then the user terminal 104 proceeds to step S703.

At step S703, the user terminal 104 sends the schedule transfer request to the content display apparatus 103. After this, at step S704, the user terminal 104 waits to receive the display schedule from the content display apparatus 103.

If the display schedule is received via the network I/O unit 405 (YES at step S704), then the user terminal 104 proceeds to step S705, and the received display schedule is displayed on the display unit 402 of the user terminal 104. From this display, the user can identify the content which was displayed on the content display apparatus 103. Then, at the next step S706, the user terminal 104 accepts selection of content the user wants to acquire, made on the display schedule.

Then, at step S707, a content sending request, including a content ID for identifying the content data selected at step S706, is sent to the content distribution apparatus 101. In response to this, as described in FIG. 5, the content distribution apparatus 101 receives the content sending request at step S504, retrieves the content data requested to be sent, and sends the content data to the user terminal 104 after determining that sending is permitted.

The user terminal 104 monitors receiving of the content data from the content distribution apparatus 101 at step S708. If the content data requested to be sent is received (YES at step S708), then the user terminal 104 proceeds to step S709, displays the received content data on the display unit 402 and stores the received content data in content data storage unit 403. After displaying the content data, the user terminal 104 returns to the standby state of step S701. On the other hand, if the content data requested to be sent is not received (NO at step S708), then the user terminal proceeds to step S710, and determines whether or not a sending disabled notification has been received from the content distribution apparatus 101. If the sending disabled notification has been received (YES at step S710), then a message indicating that content distribution is impossible is displayed on the display unit 402 to notify the user that he cannot view the content data he has requested to send. After this, the user terminal returns to the standby state of step S701.

As described above, by acquiring a display schedule from the content display apparatus 103 with the user terminal 104, it is possible for the user to identify content which he or she wants to acquire. A request to send the content data of the identified content can be made to the content distribution apparatus 101 to acquire the corresponding content data.

Next, a specific example of a display schedule data to be exchanged between the content display apparatus 103 and the user terminal 104 will be described with reference to FIG. 9. In FIG. 9, reference numeral 901 denotes the ID of a content distribution apparatus which stores content data. The content distribution apparatus ID 901 may be an IP address, for example, and the user terminal 104 can make a content transfer request to the content distribution apparatus 101 with the use of the content distribution apparatus ID 901 via the network 102.

Reference numeral 902 denotes the ID of the content display apparatus 103. For example, the URL 801 in FIG. 8 corresponds to this content display apparatus ID. The content display apparatus ID 902 makes it possible to identify the content display apparatus 103. Reference numeral 903 denotes a display time table. The display of content data, corresponding to a content ID 904, on the display unit 303 is executed according to the display time table 903. The user of the user terminal 104 can identify the content data displayed when he or she made a schedule sending request based on the time information registered with this display time table 903. Reference numeral 904 is a content ID, which is an identifier uniquely given to each content to identify the content. When making a content sending request to the content distribution apparatus 101, the user of the user terminal 104 can specify content data he or she requests to send with the use of this content ID 904.

Figure 7:
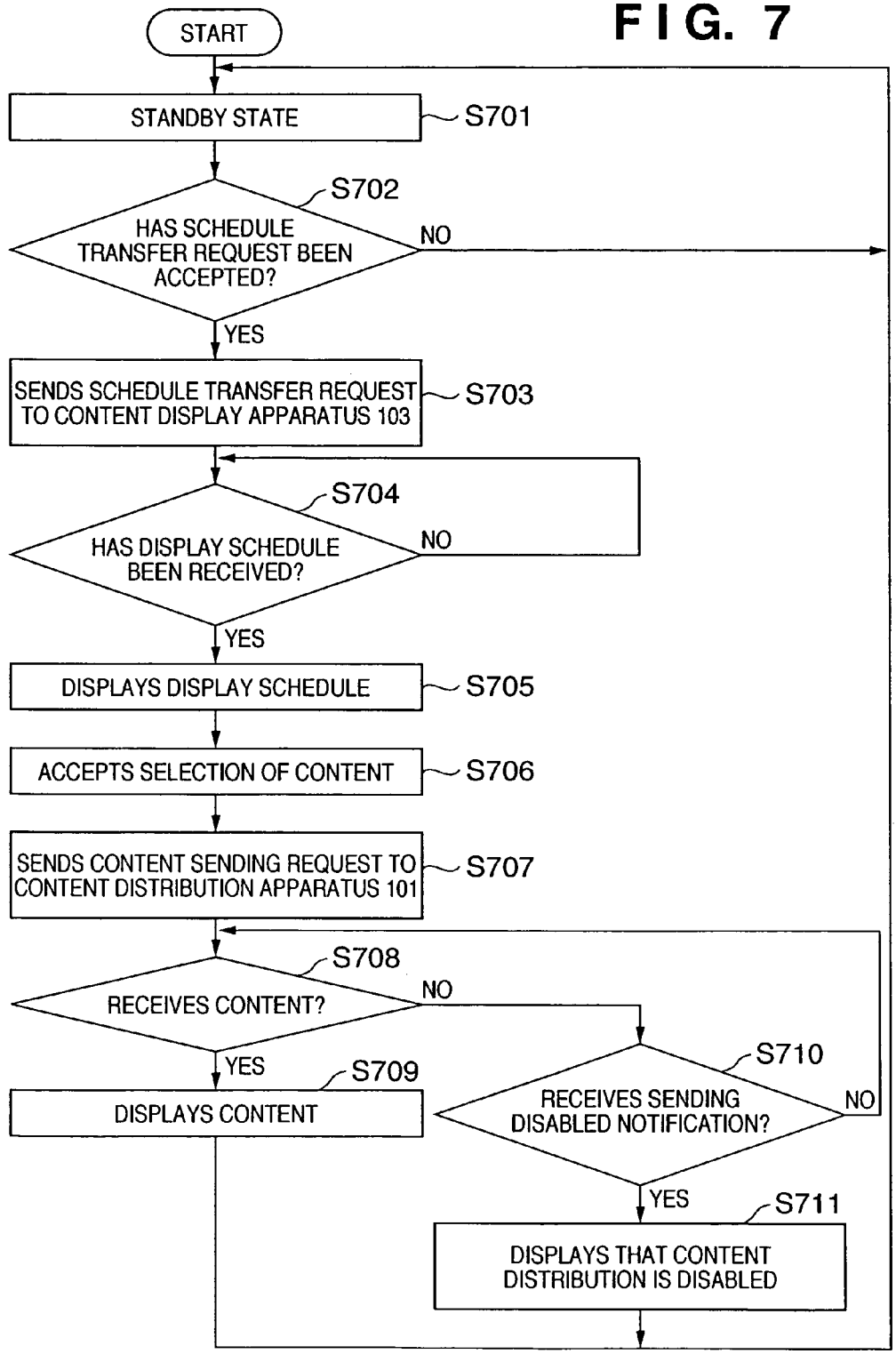
FIG. 7 is a flowchart showing an example of the operation of the user terminal 104 according to the embodiments of the present invention.

Display of the display schedule at step S705 of FIG. 7 includes at least the content data display time table 903 and the content ID 904 shown in FIG. 9. Thereby, the user can identify, based on the time when he made a schedule sending request, the content data displayed at the time. The display schedule data may include a content name and a description about content data which may be included in the display at the step S705. It makes easier for user to identify the content data.

Description will be now made on an example of the configuration of a distribution information table registered with the content data registration unit 201 to be used by the content distribution apparatus 101 to search for requested content when receiving a content sending request from the user terminal 104, with reference to FIG. 10.

In FIG. 10, reference numeral 1001 denotes a content display apparatus ID, which corresponds to the content display apparatus ID 902 in FIG. 9 and is used for identifying the content display apparatus 103. The content distribution apparatus 101 can identify the area to which content data is to be provided, based on this content display apparatus ID. Reference numeral 1002 denotes a content ID, which is a number for uniquely identifying the content. The content ID 1002 corresponds to the content ID 904 in FIG. 9. Reference numeral 1003 denotes a content name, which is a registered name of the content corresponding to the content ID 1002. The content name 1003 may be created from the distribution information registered with the content data registration unit 201.

Reference numeral 1004 denotes a distribution flag, which indicates whether or not distribution is possible in response to a corresponding content data sending request. Accordingly, the determination whether or not to permit sending of content at step S506 in FIG. 5 can be performed based on this distribution flag 1004. For example, since the distribution flag 1004 is set to "1" for content with the content name 1003 of "CM1", distribution of corresponding content data is possible. On the other hand, since the distribution flag 1004 is set to "0" for content with the content name 1003 of "MV1", distribution of corresponding content data is not permitted. This distribution flag 1004 can be arbitrarily set by a content provider, which makes it possible to protect the copyright of content data.

Reference numeral 1005 denotes the frequency of display. How often corresponding content data should be displayed in a predetermined period is registered here. For example, for content with the content ID 1002 of "A", since the frequency 1005 is set as 3 tph (3 times per hour), the display frequency is three times an hour. For content with the content ID of "M", since the frequency 1005 is set to 10 tpd (10 times per day), the display frequency is ten times a day.

In FIG. 10, description has been made of a case where the distribution flag 1004 is set for determining possibility/impossibility of distribution. However, information corresponding to a distribution flag may be included in the content name 1003 instead of setting the distribution flag 1004. For example, it is possible that content with a content name 1003 having "CM" at the top is allowed to be distributed and content with a content name 1003 having "MV" at the top is not allowed to be distributed. The method for including a distribution flag in a content name is not limited thereto, and any form may be possible only if possibility/impossibility of distribution can be identified.

As described above, according to the present invention, it is possible to create various display schedules of content data in consideration of regional characteristics of a content display apparatus of a content distribution system. Furthermore, since the content display apparatus displays content data in accordance with a display schedule, it is possible to perform distribution based on the characteristics of each individual region, and as a result, an advertisement effect can be enhanced.

Furthermore, a user can identify content which he or she is interested in based on a display schedule acquired from a content display apparatus. It is also possible to request content data corresponding to the identified content to a content distribution apparatus. Accordingly, the necessity for the content display apparatus to store content data for the purpose of providing them to users is eliminated. Thereby, the content display apparatus only has to store content data so that content can be displayed in accordance with a schedule, and the configuration for content data storage can be simplified.

Meanwhile, the content distribution apparatus can send only content data permitted by the content provider to be distributed to any user in response to a content sending request from a user terminal. Thus, distribution of content data to a user is determined to be managed not by the content display apparatus but by the content distribution apparatus, and accordingly, the configuration of the content display apparatus can be simplified. Furthermore, it is possible for the content distribution apparatus to centrally manage content data.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

Claim of Priority

This application claims priority from Japanese Patent Application No. 2004-209958 filed on Jul. 16, 2004 and Japanese Patent Application No. 2005-199144 filed on Jul. 7, 2005, the entire contents of which are hereby incorporated by reference herein.

What is claimed is:

1. A content distribution system including a content distribution apparatus, a plurality of content display apparatuses, and a user mobile terminal, wherein
the content distribution apparatus comprising:
a content data registration unit for registering distribution information including information regarding an area to which each of a plurality of content data is to be distributed, a frequency of display, distribution enabling/disabling settings for a content data sending request from a viewer;
a content data storage unit for storing the content data corresponding to the distribution information registered in the content data registration unit;
a content data search unit for searching content data based on the distribution information registered in the content data registration unit;
a content data distribution unit for distributing the content data stored in the content data storage unit to the content display apparatus;
a determination unit for determining whether transmission of the content data requested from the user mobile terminal to the user mobile terminal is permitted or not; and
a providing unit for providing the user mobile terminal with the requested content data, when the determination unit determines that the transmission is permitted;
the content display apparatus which displays the content data received from the content distribution apparatus, comprising:
a display schedule storage unit for storing a display schedule of the content data;
a first display unit for displaying connection information for use by the user mobile terminal in connecting to the content display apparatus; and
a transmission unit for transmitting the display schedule stored in the display schedule storage unit to the user mobile terminal;
the user mobile terminal comprising:
a connection unit for connecting via a network to the content display apparatus according to the connection information displayed on the first display unit of the content display apparatus;
schedule obtaining unit for obtaining the display schedule from the content display apparatus, wherein the display schedule including a content ID identifying the content data to be displayed on the content display apparatus, associated with time information of time when the content data identified by the content ID is displayed on the display apparatus and a distribution apparatus ID identifying a distribution apparatus which stores the displayed content data;
a second display unit for displaying the display schedule obtained from the content display apparatus, so that a user of the user mobile terminal can identify the content data displayed on the content display apparatus, wherein the displayed schedule includes at least the content ID and the time information;
a specifying unit for specifying such a content data that is selected by a user on the displayed schedule;
a request unit for requesting the specified content data to the content distribution apparatus having the content distribution apparatus ID corresponding to the content ID of the specified content data; and
a content obtaining unit for obtain the requested content data from the content distribution apparatus according to request by the request unit.

2. The content distribution system according to claim 1, wherein the connection information displayed on the first display unit of the content display apparatus is the URL of a web page to be accessed by the user mobile terminal.

3. A method for controlling a content distribution system including a content distribution apparatus, a plurality of content display apparatuses, and a user mobile terminal, wherein,
the content distribution apparatus comprising a content data registration unit for registering distribution information including information regarding an area to which each of a plurality of content data is to be distributed, a frequency of display, distribution enabling/disabling settings for a content data sending request from a viewer, and a content data storage unit for storing the content data corresponding to the distribution information registered in the content data registration unit,
the content display apparatus which displays the content data received from the content distribution apparatus, comprising a display schedule storage unit for storing a display schedule of the content data; and
the user mobile terminal comprising a connection unit for connecting via a network to the content display apparatus according to the connection information displayed on the first display unit of the content display apparatus,
wherein
in the content distribution apparatus, said method comprising:
searching content data based on the distribution information registered in the content data registration unit;
distributing the content data stored in the content data storage unit to the content display apparatus;
determining whether transmission of the content data requested from the user mobile terminal to the user mobile terminal is permitted or not; and
providing the user mobile terminal with the requested content data, when the determination unit determines that the transmission is permitted;

in the content display apparatus, said method comprising:

displaying connection information for use by the user mobile terminal in connecting to the content display apparatus;

transmitting the display schedule stored in the display schedule storage unit to the user mobile terminal;

in the user mobile terminal, said method comprising:

obtaining the display schedule from the content display apparatus, wherein the display schedule including a content ID identifying the content data to be displayed on the content display apparatus, associated with time information of time when the content data identified by the content ID is displayed on the display apparatus and a distribution apparatus ID identifying a distribution apparatus which stores the displayed content data;

displaying the display schedule obtained from the content display apparatus, so that a user of the user mobile terminal can identify the content data displayed on the content display apparatus, wherein the displayed schedule includes at least the content ID and the time information;

specifying such a content data that is selected by the user on the displayed schedule;

requesting the specified content data to the content distribution apparatus having the content distribution apparatus ID corresponding to the content ID of the specified content data;

obtaining the requested content data from the content distribution apparatus according to request by the request unit.

4. The method according to claim 3, wherein the connection information displayed on the first display unit of the content display apparatus is the URL of a web page to be accessed by the user mobile terminal.

5. A computer-readable storage medium having stored thereon a computer program for making a computer execute the method according to claim 3.

* * * * *